June 5, 1928.

E. J. MORDT 1,672,074

TOW ROPE

Filed June 9, 1927

Inventor:
Erik J. Mordt,
By Glenn S. Noble
Atty.

Patented June 5, 1928.

1,672,074

UNITED STATES PATENT OFFICE.

ERIK J. MORDT, OF EVANSTON, ILLINOIS.

TOW ROPE.

Application filed June 9, 1927. Serial No. 197,703.

While this invention relates to the ropes such as are adapted for towing vehicles or the like, it embodies a fastening device which may be utilized wherever applicable for fastening a rope or the like. When an ordinary rope is used for towing purposes, as for instance when one automobile tows another, it is difficult for the usual driver to tie a knot which may be readily untied after it has been drawn tight.

The objects of this invention are to provide an improved tow rope for towing vehicles or the like; to provide a tow rope having novel fastening means to permit the forming of a loop or loops at the ends of the rope; to provide a novel fastener whereby a loop may be formed in a rope and the end securely fastened to the main portion of the rope so that it is not apt to slip or become loosened; to provide novel fasteners for ropes or the like; and to provide such other advantages in construction and operation as will be described more fully hereinafter.

In the accompanying drawings showing a preferred form of this invention;

Figure 1:
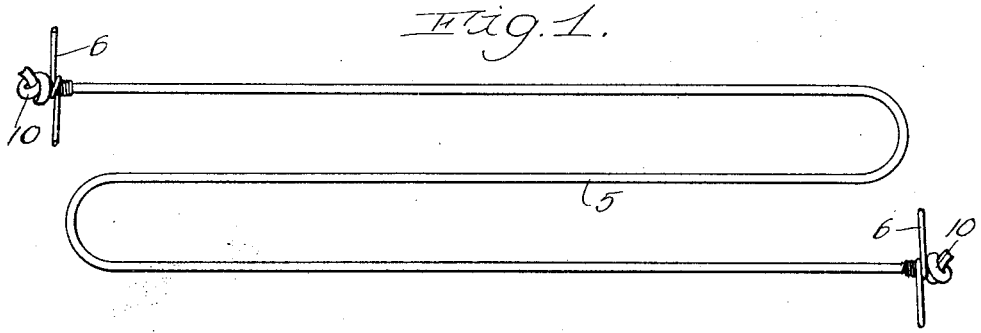
Figure 1 is a plan view of a tow rope.
Figure 2:
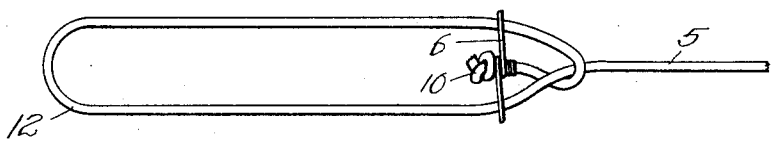
Figure 2 is a view showing a loop formed in the end of the rope with the fastening means in position for fastening the end of the rope to the body thereof.

As shown in these drawings, the rope 5 may be made of any suitable size and material, but I have found that five-eighths inch manila rope is particularly useful for ordinary vehicle towing purposes. At the ends of the rope I provide fasteners 6 which are preferably formed of short pieces of rod with an eye 7 in the middle and projections or branches 8 at the ends thereof which extend at approximately right angles to the main bar 9. These fasteners are secured to the ends of the rope in any desired manner, but I have found that a convenient method is to pass the end of the rope through the eye 7 and tie a knot 10 therein. If desired, means may be provided to hold the fastener adjacent to the knot, such as by binding a string 11 around the rope adjacent to the fastener or providing any ordinary rope clamp for such purpose.

Figure 3:
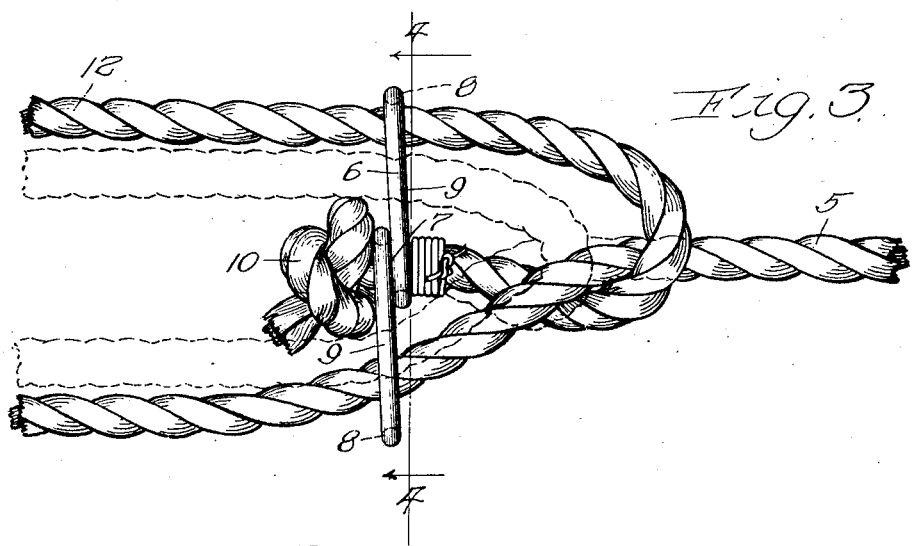
Figure 3 is an enlarged detail of the fastening arrangement.
Figure 4:
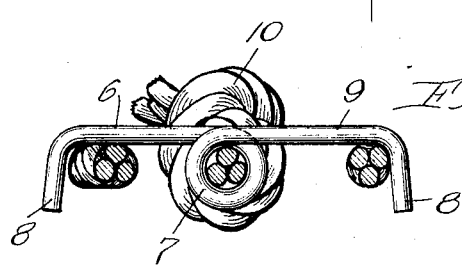
Figure 4 is a sectional view taken on the line 4—4 of Figure 3.

When the rope is to be used for towing, the end thereof is passed around any suitable part of the vehicle, such as the axle or spring, and a loop 12 is formed which may be made of any suitable length in order to adjust the length of the tow rope. The end of the rope with the fastener thereon is then passed around the main portion, and the fastener is then passed through the loop thus formed with one end engaging with the main portion of the rope and the other end engaging with the portion adjacent to the end, as shown particularly in Figures 3 and 4. When the fastener is thus applied and a strain is exerted on the rope, the end will be securely held, although it will be noted that as the strain is increased the sides of the loops will usually be drawn in against the knot 10, instead of being separated therefrom, as shown in Figure 3, this figure showing the position the parts assume before the pulling takes place. The fastener, however, effectively prevents the disconnecting or slipping of the rope, while at the same time permits the ready untying or loosening of the end when the rope is to be removed.

From this description it will be seen that I provide a simple and effective means for forming a loop on the end of a rope for towing purposes or the like, and it will be noted that the fastener may be made in different forms and may be secured to the rope in different ways, without departing from the scope of this invention; therefore I do not wish to be limited to the exact construction herein shown and described, except as specified in the following claim, in which

I claim:

The combination with a tow rope or the like, of a fastening member comprising a transversely arranged rod secured to the end thereof and adapted to project over the adjacent plies of the rope when the loop is formed therein.

ERIK J. MORDT.